United States Patent
Bittner et al.

(10) Patent No.: US 8,851,137 B2
(45) Date of Patent: Oct. 7, 2014

(54) WINDING METHOD AND APPARATUS

(75) Inventors: Dale F Bittner, Harrison, OH (US); Christopher R Lyman, Milford, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 773 days.

(21) Appl. No.: 12/713,218

(22) Filed: Feb. 26, 2010

(65) Prior Publication Data

US 2011/0209818 A1 Sep. 1, 2011

(51) Int. Cl.
 *B65H 81/00* (2006.01)
 *B65H 19/22* (2006.01)

(52) U.S. Cl.
 CPC .................................. *B65H 19/2223* (2013.01)
 USPC ........... 156/446; 156/187; 156/443; 156/458; 242/522; 242/533.4

(58) Field of Classification Search
 CPC ...................................... B65H 19/2223; B65H 2408/231–2408/23157; B65H 2408/233
 USPC .................. 156/184, 190, 443, 446, 447, 458
 See application file for complete search history.

(56) References Cited

U.S. PATENT DOCUMENTS

| | | | |
|---|---|---|---|
| 3,599,888 A | 8/1971 | Coudriet et al. | |
| 3,848,823 A | 11/1974 | Mitchell | |
| 3,885,749 A * | 5/1975 | Skacel | 242/420 |
| 5,030,311 A * | 7/1991 | Michal et al. | 156/256 |
| 5,221,056 A | 6/1993 | Walliser et al. | |
| 5,370,711 A | 12/1994 | Audit et al. | |
| 5,700,299 A | 12/1997 | Clark | |
| 5,718,395 A | 2/1998 | Nakanose et al. | |
| 5,779,180 A * | 7/1998 | Smedt et al. | 242/528 |
| 6,500,377 B1 | 12/2002 | Schneider et al. | |
| 6,585,846 B1 | 7/2003 | Hanson et al. | |
| 6,620,276 B1 | 9/2003 | Kuntze et al. | |
| 6,656,312 B1 | 12/2003 | Schmitz et al. | |
| 2003/0226928 A1* | 12/2003 | McNeil et al. | 242/413.2 |
| 2007/0045464 A1 | 3/2007 | McNeil et al. | |
| 2007/0215741 A1* | 9/2007 | Vaughn et al. | 242/526.1 |
| 2008/0237390 A1* | 10/2008 | Okizaki | 242/615.2 |
| 2011/0095116 A1* | 4/2011 | Hada et al. | 242/160.1 |

FOREIGN PATENT DOCUMENTS

| | | |
|---|---|---|
| CN | 201254407 Y | 6/2009 |
| TW | M314748 U | 7/2007 |

OTHER PUBLICATIONS

International Search Report dated May 27, 2011, 5 pgs.

* cited by examiner

*Primary Examiner* — John Goff
*Assistant Examiner* — Carson Gross
(74) *Attorney, Agent, or Firm* — David K Mattheis; Kim W Zerby

(57) ABSTRACT

A winding apparatus comprises a rotating winding drum, a lay down station, a cutting station, a web assembly hold down element and a wound assembly discharge station. The rotating winding drum further comprises a plurality of winding stations. Each winding station comprises a winding mandrel, a winding nip, a web stabilizing bed and a cutting anvil.

13 Claims, 4 Drawing Sheets

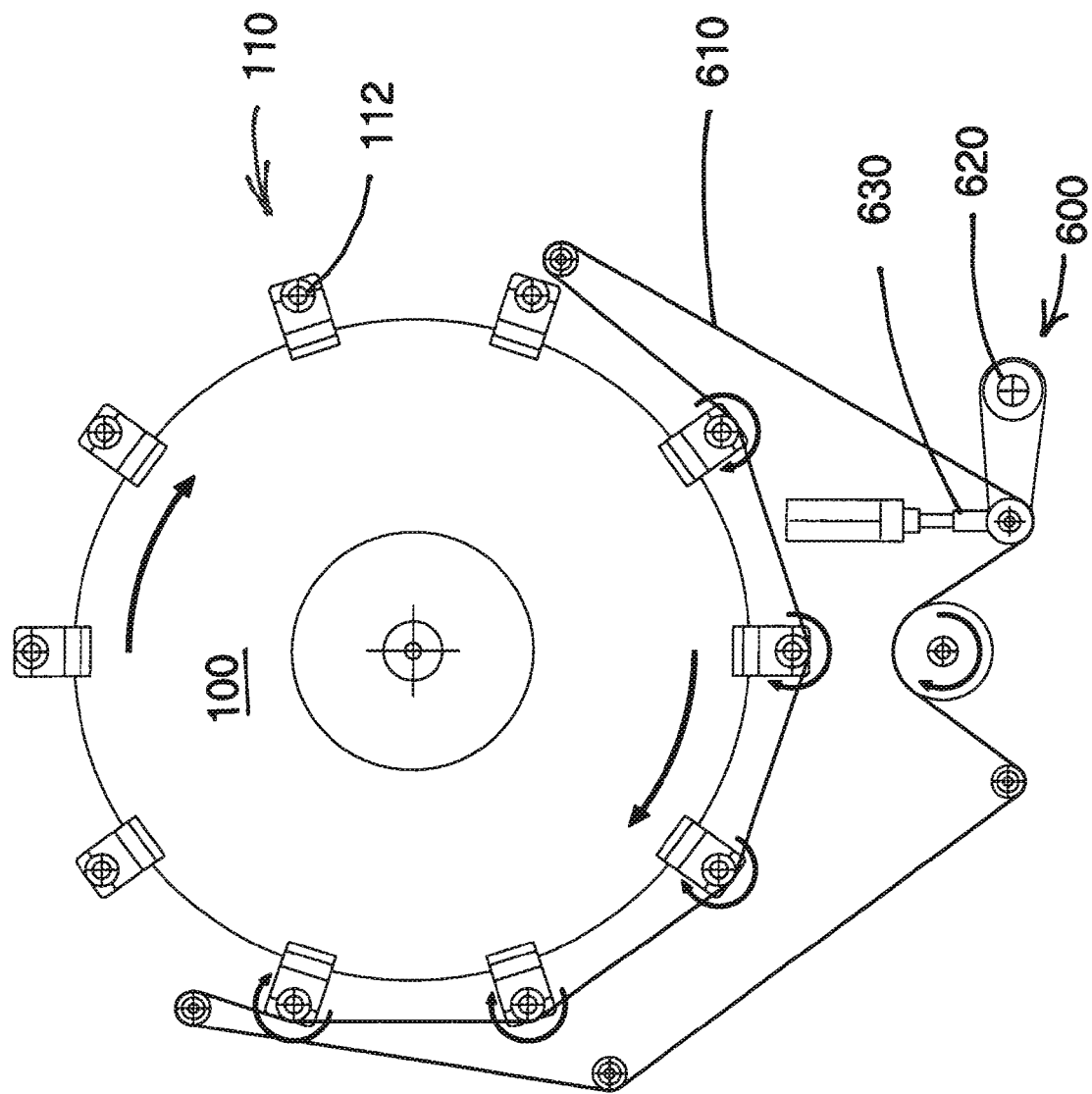

WINDING METHOD AND APPARATUS

FIELD OF THE INVENTION

The invention relates to methods and apparatus for winding layered structures. The invention relates particularly to methods and apparatus for winding structures comprised of discrete layers.

BACKGROUND OF THE INVENTION

Wound layered structures are known in the technological arts. Wound structures, such as rolls of paper materials, composite wound paper laminates, wound nonwoven structures, and wound electrode structures are well known.

One limitation relating to winding structures is the speed at which the winding occurs. Winding systems may be limited by the maximum speed at which a structure may effectively be wound. This speed may be lower than the speed at which individual components of the wound structure may be transported and provided to a winding station.

Some structures comprise material components which are sensitive to mechanical handling issues. These materials may require winding systems which minimize or eliminate any handling operations which subject the materials to tensile forces.

What is desired is a method and apparatus for winding a structure where the winding speed is decoupled from the material transport speed. The structure may be comprised of multiple discrete layers, or of a single layer. The method and apparatus may wind structures while subjecting component elements of the structure to little, if any tensile forces.

SUMMARY OF THE INVENTION

In one aspect a winding apparatus comprising a rotating winding drum, a lay down station, a cutting station, a web assembly hold down element and a wound assembly discharge station. The rotating winding drum further comprises a plurality of winding stations. Each winding station comprising a winding mandrel, a winding nip, a web stabilizing bed and a cutting anvil.

In one aspect, a winding method comprising steps of: rotating the winding drum; transferring a first web structure from a first lay down station to the web stabilizing bed of a first winding station; cutting the web structure; contacting the web structure with the web assembly hold down element, winding the web structure into a roll assembly; and discharging the roll assembly from the winding drum.

In one aspect, a winding method comprising steps of: rotating the winding drum; transferring a first web from a first lay down station to the web stabilizing bed of a first winding station; transferring a second web from a second lay down station to a face-to-face position with the first web upon the web stabilizing bed of the first winding station; cutting the second web; contacting the second web with the web assembly hold down element, winding the assembled webs into a layered roll assembly; and discharging the layered roll assembly from the winding drum.

BRIEF DESCRIPTION OF THE DRAWINGS

FIG. 4 schematically illustrates a side view of a portion of an embodiment of the invention.

DETAILED DESCRIPTION OF THE INVENTION

Figure 1:
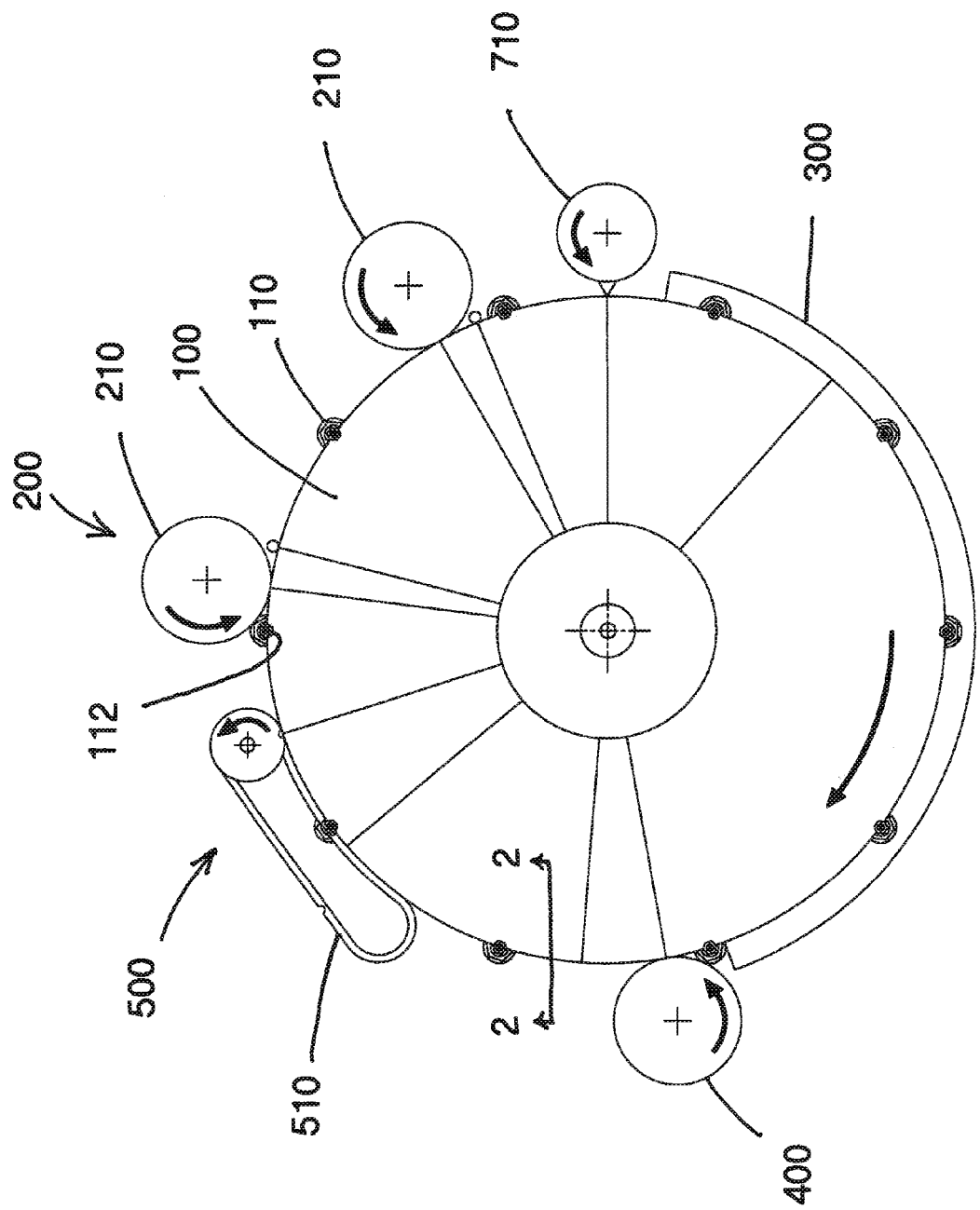
FIG. 1 schematically illustrates a side view of one embodiment of the apparatus of invention.

A winding apparatus comprises a winding drum. The winding drum may generally comprise a cylinder arrayed substantially symmetrically about a central axis. The winding drum may be configured to rotate about the central axis. The rotation of the winding drum may be continuous or intermittent. The winding drum may be considered to be comprised of a collection of circumferences. Each winding drum circumference may rotate about the central axis. Each circumferential point may be defined as lying in a plane of rotation. The respective planes of rotation lying perpendicular to the central axis of the winding drum. The rotation of the winding drum about the central axis causes each point of the circumference of the winding drum to define a circle centered upon the central axis and lying in a plane of rotation. The winding drum comprises at least one winding station. The winding station comprises a mandrel drive element and a winding nip element.

In one embodiment the mandrel drive element may be coupled to a winding mandrel and may rotate the mandrel to wind the structure. The mandrel may comprise a split mandrel of at least two parts which may be moved laterally independent of each other. The split mandrel may mechanically capture at least one web element to facilitate winding the structure. Alternatively, the mandrel may be a single element and may be coupled to the web using static electricity, adhesive, vacuum, or other coupling means as are known in the art. A single mandrel may be a solid or hollow core element.

In one embodiment the mandrel may be comprised of a frangible series of joined elements which may be individually separated and may each become part of the individual wound structures. Such mandrels may be comprised of paper stock, polymer, metal, wood or other materials as necessary for desired properties of the finished structures.

The mandrel may comprise a particular cross sectional shape transverse to the mandrel rotation. The shape of the mandrel relates to the shape of the wound structure. A round cross section yields a round structure. Similarly, an oval elliptical rectangular or square cross section each leads to a similarly shaped wound structure. The corners of a rectangular, squares or other regular polygon cross section may be sharp or broken depending upon the particular web materials being wound and the desired final shape of the wound structure.

The mandrel drive element may be driven by a local drive motor which is direct coupled to the element, or which is coupled to the mandrel drive element via a chain, belt or gear system, or a combination of these.

In one embodiment the mandrel drive element may be driven and may comprise a sheave or pulley coupled to a mandrel and disposed such that the mandrel drive element tangentially contacts a driven belt which is external to the winding drum. In this embodiment, the mandrel drive element and the mandrel will be driven while in contact with the moving belt. In this embodiment, the mandrel drive element will not be driven when not in contact with the belt and when the belt is not moving.

This configuration may be utilized for an apparatus comprising a plurality of winding stations, each comprising a mandrel drive element. The plurality of stations may be arrayed along the circumference of the winding drum. As the drum rotates, each mandrel drive element may sequentially be brought into contact with a driven belt over a portion of each rotation of the winding drum. In this manner, each mandrel drive element may be powered or driven over a particular segment of each rotation of the winding drum with a single common drive belt.

The radial position of the mandrel drive element with respect to the central axis of the winding drum may be fixed, or the radial position of the mandrel drive element may vary according to a predetermined path. In one embodiment the mandrel drive element may comprise a cam follower moving along a fixed cam as the winding drum and mandrel dive element rotate around the central axis of the winding drum. In this embodiment, the radial position of the mandrel drive element may vary in a regular manner over the course of a rotation of the winding drum. This regular progression may be used to accommodate the growth in the radial dimension of the wound structure as winding progresses. Moving the mandrel drive element along a radius may enable the outer circumference of the wound structure to maintain a substantially fixed radial position with respect to the central axis of the drum even as the structure is wound and increases in size.

In one embodiment the winding apparatus comprises single web lay down station. The web lay down station may comprise a pick and place system for providing a portion of a web material for winding into the wound structure. In this embodiment, the web material may be made available at a location that is not tangential to any circumference of the winding drum. The web may be picked from a staging area and placed upon the circumference of the winding drum.

In an alternative embodiment, the web lay down may be a rotary web lay down comprising a rotating drum having a tangential contact with a circumference of the winding drum. In this embodiment, continuous or discrete web portions may be disposed from the rotary web lay down to a circumference of the winding drum. The transfer of discrete web portions to the winding drum may comprise the step of altering the pitch or spacing and timing of the web portion between the delivery of the web portion from the web supply and the transfer of the web portion to the winding drum circumference.

The winding apparatus may also comprise one, or a plurality of web lay down stations. Any combination of pick and place, rotary, manual, and other web transfer mechanisms as are known in the art may be used to transfer web portions to the circumference of the winding drum.

Discrete web portions which are transferred to the winding drum may in turn comprise a number of discrete elements combined to comprise a more elaborate web structure. In one embodiment a conductive tab may be fixedly adhered to a web portion using adhesive, tapes, welds or other fastening means to provide the combination of the base web and the conductive tab for deployment to the winding drum.

The web materials laid down upon the circumference of the winding drum may be captured by the mandrel as described above. A split mandrel may be used to mechanically capture the web with each of two portions of the mandrel on either side of the web. In this configuration, the web will move and wind about the mandrel as the mandrel rotates.

The winding station further comprises a winding nip element. The winding nip element forms a pressure nip point together with the mandrel. The web materials pass through the nip as winding occurs. The winding nip element may comprise a substantially rigid or compliant material. It may be fixed or may rotate. The rotating winding nip element may be driven independently from the motion of the web or may move in response to the passage of the web materials through the nip. The winding nip element may be biased against the mandrel. The bias may be provided by the use of a spring to hold the winding nip element against the mandrel and the wound structure. The winding nip element may also be biased using any mechanical system known for such a use such as, but not limited to, cams and cam followers, air or hydraulic cylinders, rack and pinion gear systems and combinations of these systems.

A discrete web may be laid upon the winding drum such that the leading edge of the web coincides with the location of the mandrel of the winding station. Alternatively, the discrete web may be disposed up rotation from the mandrel and subsequently attached to a second web disposed upon the winding drum and also upon the discrete web. This second web may be disposed with a leading edge coinciding with the location of the mandrel or the second web may comprise a continuous web. A continuous web disposed upon the winding drum may overlay the first discrete web and winding mandrel location. The continuous web may be separated into discrete portions subsequent to being disposed upon the winding drum. This separation of the continuous web may occur after that portion of the continuous web coinciding with the location of a particular winding station mandrel has been captured by the mandrel.

The winding apparatus may comprise a web separating element. The web separating element may comprise a portion of the lay down station, each winding station may comprise a web separating element, the web separating element may comprise a system of elements including an element of each winding station acting in cooperation with an element external to the winding drum to cause web separation. The web separating element may comprise a cutting anvil as part of the winding station acting in cooperation with a cutting element. The cutting element may comprise one or more knives disposed upon the outer circumference of a cutting drum. The size of the cutting drum, the spacing of the knives and the rotational speed of the cutting drum relative to the winding drum may be configured to bring a knife into the proximity of the web material and the cutting anvil of the winding station such that the web material is separated. The separation may be due to a cut caused by interference between the path of the knife and the path of the upper surface of the anvil. The separation may be a burst separation due to an open nip between the knife and anvil sufficiently small to burst the intervening web material. The separation may be accomplished using one or more cutting wires configured to interact with the web material and to cause separation by heating thermoplastic web material until separation occurs. A pulsed or reciprocating laser may be configured to separate the web material. A rotary or reciprocating saw may be configured to move in concert with the web material as it traverses the width of the web material to cause web separation.

Separation of the web material yields a tail end and a leading end, or edge, of the respective portions of the web material. The leading end may be captured by the mandrel as described prior to web separation. Control of the leading end is thereby maintained as the winding process progresses. At least a portion of the web material between the leading edge and the tail edge may be under the influence of the stabilizing element (described below) prior to the web separating event. Control of the web materials tail end is thereby enhanced.

Continuous web materials may be transferred to the winding drum using a rotary web transfer system as is known in the art. The continuous web material may follow a web path around a transfer drum to a position upon the circumference of the winding drum.

The sequence of laying down a discrete web, laying down a continuous web upon the discrete web and attaching the two webs, capturing the continuous web with the mandrel, separating portions of the continuous web, winding the stack of attached webs into a wound structure while stabilizing the stack between the winding drum and stabilizing element illustrates one method of utilizing the apparatus. The stack may also comprise additional discrete and or continuous web portions provided by additional lay down stations as described.

In one embodiment a series of first web structures each comprising a combination of discrete and continuous webs are laid down as the winding drum proceeds through each rotation. The structures are individually wound as the winding mandrels pass beneath the stabilizing element such that the structures are provided lateral stability relative to the central axis during winding.

In one embodiment a first discrete web material is laid down followed directly by a first continuous web material, a second discrete web material and a second continuous web material to form a series of four-web stacks as the winding drum proceeds through each rotation. The stacks are individually wound as the winding mandrels pass beneath the stabilizing element such that the stacks are provided lateral stability relative to the central axis during winding.

The web materials are transferred from the lay down element to a circumferential surface of the winding drum. The circumferential surface may comprise a web guide track. In one embodiment the web guide track comprises a web transfer or support surface disposed along the circumference of the winding drum at a first radius from the central axis of the drum. The transfer surface comprises a surface having a dimension transverse to the rotation of the drum equal to or greater than the transverse dimension of the web material in a single web structure or the first web material transferred to the winding drum in a multiple web structure.

The web guide track may also comprise one or more apertures operatively connected to a low pressure or vacuum source. The first web material may be subjected to a low pressure or vacuum to reduce the likelihood of the web material shifting in position after it has been laid down and prior to winding. As the winding step for any particular station commences, the application of the low pressure or vacuum to the first web may be gradually or abruptly ceased. In one embodiment, the application of the low pressure/vacuum may be constrained to follow the tail end of the web material as it is wound. In this embodiment, the winding drum interior is segmented for each winding station. The segments each comprise an operable connection to a low pressure or vacuum source and each segment comprises a movable segment wall configured to move toward a fixed segment wall as the winding sequence progresses and to retrace its path to an initial position prior to the transfer of the first web of the next revolution of the winding drum. The motion of the movable segment wall may be accomplished using a cam follower and cam, a rack and pinion, rotary or linear actuators or other means as are known in the mechanical arts.

The transverse cross section of the transfer surface may be substantially parallel to the central axis of the winding drum, or the cross section may be biased with respect to the central axis. Providing a biased surface may subject the web materials to desirable forces transverse to the direction of drum rotation during the web transfer and winding operations.

The cross section of the web guide track may include one or more steps. The steps may provide additional support surfaces for subsequent web materials in a multiple web structure. The steps may be separated radially by one or more guide track edge elements. Web guide track edge elements and steps may be disposed along a single edge of the transfer surface or along both edges of the transverse cross section of the surface. The web guide track may comprise a first surface and a series of steps along one edge together with a single edge element along the other edge or a height corresponding at least to that of the series of steps.

In one embodiment the initial web material is disposed in the bottom of the web guide track and substantially fills the portion of the guide track between the lower track surface and the first step surface. A second web is deposited upon the drum in the web guide track and upon the first web. In one embodiment, the second web has an axial width greater than that of the first web and the second web substantially fills the portion of the web guide track between the first step and a second step. In one embodiment the first and second web materials may be stacked in the space between first track edge elements with none of the first or second web material protruding above the first step of the track. In another embodiment, a portion of the second web may protrude above the first step on one or both edges of the track. In this embodiment, a third web material may be stacked upon the second web material. The protrusion of the second web upon one or more steps may physically separate the first and third webs. Additional web materials may subsequently be disposed upon the three web stack along the web guide track.

During the step of winding the structure from the web stack, it is possible to subject the web stack to lateral forces which vary across the transverse- or axial-dimension of the web. Web materials subjected to these varying forces may undergo a lateral position shift if not constrained. The cross section of the web guide track may provide lateral stability to the web stack as the stack proceeds along the web guide track during the winding step.

One or more stabilizing elements may be present to provide additional stability in the transport of the web after the web has been disposed upon web guide track of the circumference of the winding drum. The stabilizing element may comprise fixed or rotating elements.

One or more rollers may be used to assist in stabilizing the position of the web or webs upon the winding drum. The roller(s) may be disposed relative to a circumference of the winding drum to provide a zero clearance nip with the drum, an open nip, or an interference nip wherein the roller, the drum, or both are subject to compression.

A stationery element such as compliant foam, sponge or brush may be used to stabilize the web materials after lay down has occurred. The stabilizing element may extend along a segment of the circumference of the winding drum. The position of the stabilizing element may be fixed relative to the rotation of the drum such that the rotation of the drum will cause the circumference of the drum to pass the stabilizing element during each revolution.

The stabilizing element may extend along the circumference of the winding drum such that the web materials are disposed between the element and the drum circumference as the materials are wound via the rotation of the mandrel.

The stabilizing element may be disposed to provide no clearance between the element and the circumference of the drum. The stabilizing element may be placed under a compressive load or may be placed such that there is no clearance without compressively loading the stabilizing element. rotating drum and the stabilizing element. Alternatively, the stabilizing element may be disposed to provide a gap between the element and the winding drum. The gap may be identical to the nominal thickness of the web materials handled by the winding apparatus of the gap may be smaller than this thickness to provide the desired degree of loading of the web materials as the winding drum rotates past the stabilizing element.

The stabilizing element may comprise a cross section transverse to the direction of rotation of the winding drum substantially identical to the cross section of the web guide track. Alternatively, the stabilizing element may comprise a cross section distinct from that of the web guide track. The stabilizing element may be subject to compression as described above and may conform to the cross section of the web guide track and/or the web guide track-web combination.

The winding apparatus further comprises a wound structure tail fixing station. The tail fixing station facilitates securing the outer wrap of the wound web materials to the remainder of the structure. The station may perform this function via the application of an adhesive laminate outer wrap to the circumference of the wound structure. The axial width (the dimension of the material parallel to the central axis of the winding drum during application) of such an outer wrap may be coextensive with the axial width of the wound structure or the outer wrap may be either larger or smaller than the axial width of the structure. A plurality of outer wraps may be applied to the wound structure. The length of the outer wrap may be greater than the circumference of the wound structure to ensure that the tail portions of the web materials are completely secured.

In an embodiment where the angular position of the web material tails are known, such as where each mandrel is coupled to an angular position resolver, the length of the outer wrap may be less than the circumference of the wound structure and the placement of the outer wrap may be controlled such that tail of the web materials are secured to the remainder of the wound structure.

The station may secure the web material tails using an elastic band disposed around the circumference of the wound structure, by applying a fixative coating to the structure, by positioning a heat-shrink sleeve and subsequently applying the heat necessary to shrink the sleeve or using other fixative means as are known in the art.

The tail fixing station is disposed with a tangential contact to the winding drum at a circumferential location between the stabilizing element and the first lay down station considered in the direction of rotation of the winding drum.

The winding apparatus further comprises a discharge station for transferring the wound structures from the drum. This station is disposed between the tail fixing station and the first lay down station considered in the direction of rotation of the winding drum. The discharge station comprises a removal element which, in turn, may comprise a pick and place assembly to pick the wound structure from the winding drum and place it in a holding assembly or transfer the structure directly to a conveying system for further handling.

In one embodiment the removal element comprises a moving belt having tangential contact with the winding drum circumference. The belt may comprise one or more cavities and may be configured to open and close the cavities such that the open cavity contacts the wound structure and subsequently closes capturing the structure and carrying it away from the winding drum along the path of the belt. The belt may comprise a seamed or seamless belt or a series of belt links flexibly joined together. The belt may be disposed adjacent to a vacuum plenum (which in turn is operatively connected to a vacuum source) such that a negative air pressure may be used in capturing and/or holding the wound structure for removal from the winding drum.

Web Description:

The web materials wound by the apparatus may comprise simple homogeneous materials or more complex composite structures comprised of numerous elements. The web materials may be provided as discrete elements or as a continuous web which is separated into individual segments. The web materials may comprise paper, metal, polymers and combinations thereof. The web materials may comprise films, nonwovens, foils, woven structures and combinations thereof.

Winding Methods:

The following examples provide non-limiting methods of using the above described apparatus.

The description is provided in terms of the steps which occur at a single winding station. The same sequence of steps may be performed concurrently at a plurality of winding stations spaced circumferentially around the drum. The rotation of the winding drum moves each station through 360 degrees of rotation. As each station progresses through each rotation, winding steps may be executed relative to the station. The winding steps may be associated with particular segments of the rotation. As an example, a particular step may occur as the winding station moves through the first 45 degrees of the 360 degrees.

In one embodiment the winding drum is continuously rotated about the central drum axis. As a winding station progresses through a first segment of the rotation, a first web material is transferred from a first lay down station to the winding station. A second web material is transferred from a second lay down station to a position adjacent to the first web material and in a face-to-face relationship with the first web material. The first and second web materials form a web assembly.

A winding mandrel contacts and attaches to the web assembly. The rotation of the winding drum brings the second web material into contact with a web stabilizing element. After the web stabilizing element contacts the web assembly, the mandrel rotates to wind the assembly. The rotation of the winding mandrel draws the web assembly forward in the direction of the travel of the winding drum. The web assembly is wound upon itself between the winding mandrel and a winding nip element. The winding nip element provides a tension in the web assembly and reduces the likelihood of wrinkles in the webs as the wound structure is formed.

As or after the winding of the web assembly is completed, the tails of the first and second web materials are fixed to reduce the possibility of the wound assembly unwinding. The rotation of the drum moves the winding station to a position where the wound assembly with the fixed tails is discharged from the winding apparatus. In one embodiment, one of the first or second web materials is provided as a continuous web material. As or after the leading edge of the web material is transferred to the winding drum, a portion of the web material is separated to facilitate the winding of the web assembly. The separation may occur as part of the web lay down such that the web is discrete as transferred to the winding drum. In one embodiment the separation may occur after the entire portion of the web material to be incorporated into the web assembly has been transferred. In this embodiment, the separation yields a leading and trailing edge of the web material upon the circumference of the winding drum.

In one embodiment a plurality of winding station spaced about a circumference of the winding drum each perform the enumerated steps as the winding drum rotates about the central axis.

In one embodiment the first and second web materials may be at least partially attached to each other prior to winding the web assembly. In this embodiment, the leading edges of the two web may be attached or the leading edge of one web may be attached to any portion of the other web. The attachment may be accomplished using an adhesive, a cohesive, by welding the materials or by otherwise bonding the web materials to each other.

In one embodiment the tails of the web assembly may be fixed by overwrapping the wound assembly with a portion of adhesive tape. The axial width of the tape may be equal to the widest axial dimension of the wound assembly or the axial widths may be distinct from each other. The tape may be applied without regard to the angular position of the tail ends and the tape may be applied over more than 360 degrees of wrap around the assembly. In one embodiment the tape may be applied in registration with the angular position of the tails and may be sized to overwrap the tail ends plus a predetermined amount of the circumference of the wound assembly which is less than the full circumference of the assembly.

In one embodiment the web materials are transferred to a web guide track upon a circumference of the winding drum. The web guide track may comprise a simple track having a single edge or a more complex track as asset forth above.

In one embodiment a third web material may be laid down in a face to face relationship with the web assembly of the first and second webs prior to winding. The new three web assembly may subsequently be wound as described above.

EXAMPLE

As shown in FIG. 1, the winding drum 100 comprises a plurality of winding stations 110. Each winding station 110 comprises a mandrel drive element 112. The winding drum 100 is disposed adjacent to a plurality of web lay down stations 200. Each web lay down station 200 comprises a rotary lay down drum 210. Web separating element 710 is disposed adjacent to the winding drum 100. Web assembly hold down element 300 is also disposed adjacent to the winding drum 100. The web assembly hold down element 300 may comprise a compliant element or a plurality of rolling elements. The winding drum is disposed adjacent to an adhesive application station 410. The rolling elements may be comprised of a rigid or a compliant material. The wound assembly discharge station 500 is disposed adjacent to the winding drum 100 and comprises the wound assembly removal element 510.

Figure 2:
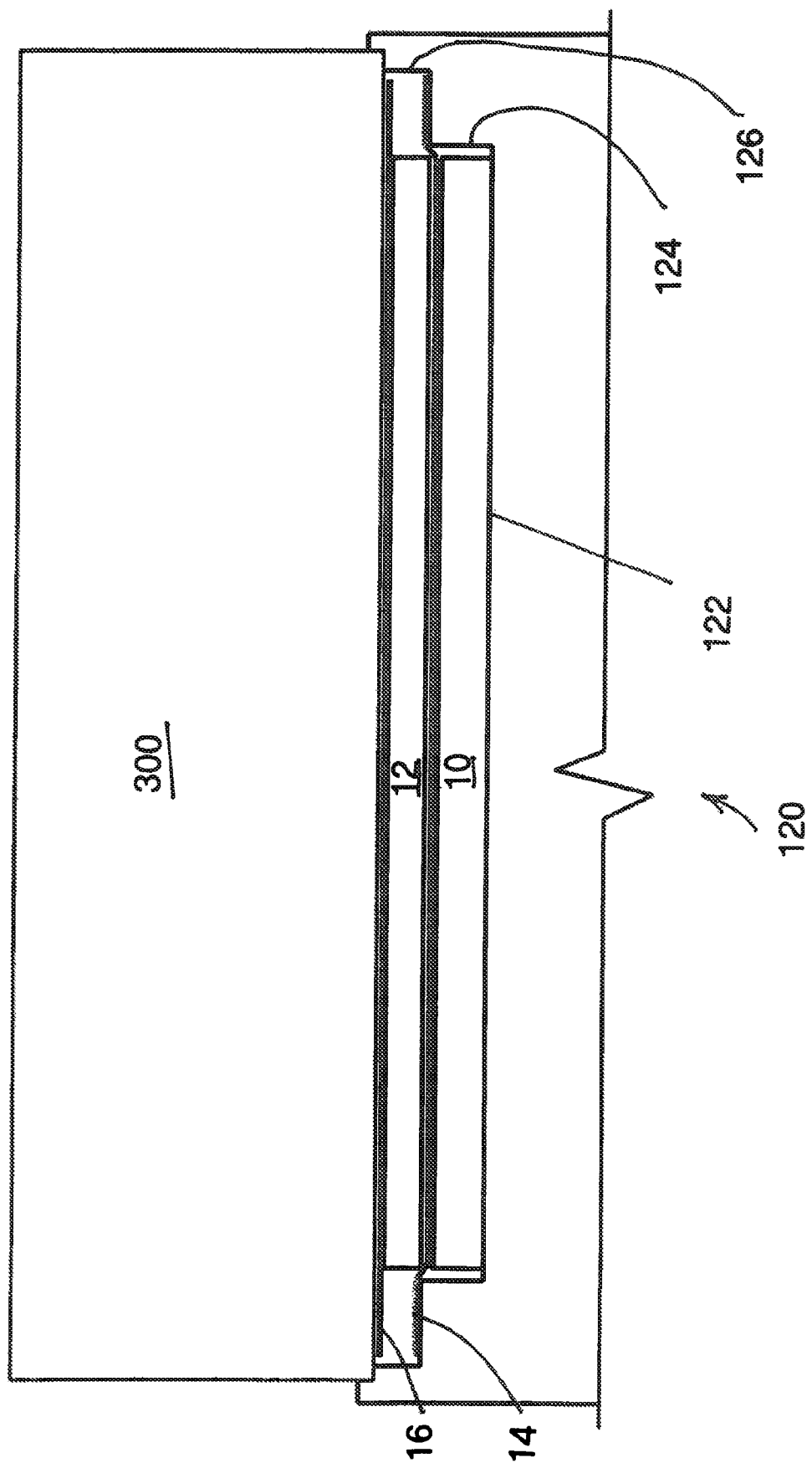
FIG. 2 schematically illustrates a cross-section of a portion of the side view of a winding station of one embodiment of the invention.

As shown in FIG. 2, the web guide track 120 comprises web transfer surface 122, first web guide track edge element 124 and second web guide track edge element 126. Web assembly hold down element 300 is disposed adjacent to the web transfer surface. Also shown in the figure are a first 10, second 12, third 14 and fourth 16 web materials disposed in the web guide track 120 upon the web transfer surface 122.

Figure 3:
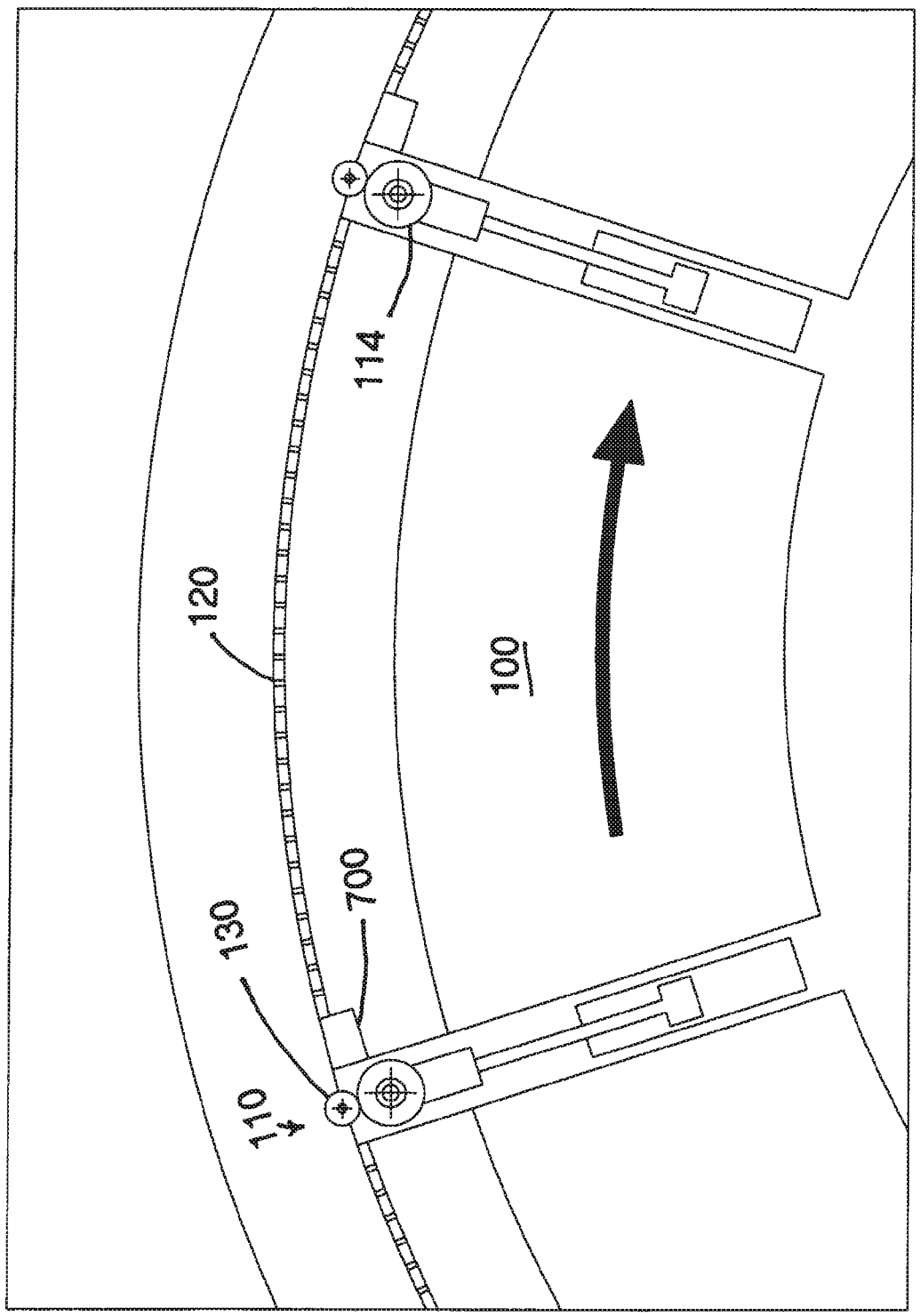
FIG. 3 schematically illustrates a side view of a portion of an embodiment of the invention.

As shown in FIG. 3, winding nip element 114 is disposed adjacent to the winding mandrel 130. The web separation station 700 is disposed on a circumference of winding drum 100 in the direction of travel of the winding drum 100 from the winding station 110.

As shown in FIG. 4, winding station drive element 600 is disposed adjacent to mandrel drive elements 112. The winding station drive element in the figure comprises a driven belt 610, a drive assembly 620 and belt tensioning element 630. The belt 610 is disposed to maintain contact with the mandrel drive elements 112 over a portion of each rotation of the winding drum 100 to enable winding the wound assemblies as the winding stations 100 pass through that portion of each rotation.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A winding apparatus comprising:
   a) a winding drum, the winding drum comprising at least one winding station, the winding station comprising a mandrel drive element and a winding nip element;
   b) at least one web lay down station having tangential contact with a circumference of the winding drum;
   c) a web assembly hold down element disposed adjacent to a circumference of the winding drum and extending along a portion of the circumference of the winding drum;
   d) a web assembly tail fixing station disposed along a circumference of the winding drum between the web assembly hold down element and the web lay down station;
   e) a wound assembly discharge station comprising a wound assembly removal element disposed adjacent to the circumference of the winding drum.

2. The winding apparatus according to claim 1 wherein the winding station further comprises a web guide track.

3. The winding apparatus according to claim 2 wherein the web guide track comprises a web transfer surface disposed along a portion of a circumference at a first radius of the winding drum and a first web guide track edge element disposed adjacent to the web transfer surface and defining a step change in the web guide track cross section from the first winding drum radius to a second winding drum radius.

4. The winding apparatus according to claim 3 wherein the web guide track comprises a second web guide track edge element disposed adjacent to the first web guide track element and defining a step change in the web guide track cross section from the second winding drum radius to a third winding drum radius.

5. The winding apparatus according to claim 1 further comprising a winding mandrel.

6. The winding apparatus according to claim 1 further comprising a plurality of winding stations.

7. The winding apparatus according to claim 6 wherein the plurality of winding stations share a common winding station drive element.

8. The winding apparatus according to claim 1 wherein the lay down station comprises a rotary lay down drum.

9. The winding apparatus according to claim 8 wherein the at least one lay down station comprises a vacuum assisted web holding system.

10. The winding apparatus according to claim 1 wherein the web assembly hold down element comprises a compliant element.

11. The winding apparatus according to claim 1 wherein the web assembly hold down element comprises a plurality of rollers disposed a long a portion of a circumference of the winding drum and each roller forming a nip point with the winding drum.

12. A winding apparatus according to claim 1 further comprising a web separating station disposed along a circumference after the last lay down station and comprising a web separating element.

13. A winding apparatus comprising:
a) winding drum, the winding drum comprising a plurality of winding stations, at least one winding station comprising a web guide track, the web guide track comprising a web transfer surface disposed along a portion of a circumference at a first radius of the winding drum, a first web guide track edge element disposed adjacent to the web transfer surface and defining a step change in the web guide track cross section from the first winding drum radius to a second winding drum radius and a second web guide track edge element disposed adjacent to the first web guide track element and defining a step change in the web guide track cross section from the second winding drum radius to a third winding drum radius, a split winding mandrel, a mandrel drive element and a winding nip element;
b) a plurality of web lay down stations having tangential contact with a circumference of the winding drum, at least one lay down station comprising a rotary lay down drum;
c) a web assembly hold down element disposed adjacent to a circumference of the winding drum and extending along a portion of the circumference of the winding drum;
d) a web assembly tail fixing station disposed along a circumference of the winding drum between the web assembly hold down element and the plurality of web lay down stations;
e) a wound assembly discharge station comprising a wound assembly removal element disposed adjacent to the circumference of the winding drum; and
f) a web separating station disposed along a circumference after the last lay down station and comprising a web separating element.

* * * * *